United States Patent [19]

Karford

[11] Patent Number: 4,792,176

[45] Date of Patent: Dec. 20, 1988

[54] EXTENSION UNIT FOR SUN VISOR

[76] Inventor: Fred Karford, 3520 E. 17th St., Idaho Falls, Id. 83401

[21] Appl. No.: 46,731

[22] Filed: May 7, 1987

[51] Int. Cl.$^4$ .............................................. B60J 3/02
[52] U.S. Cl. ................................... 296/97.8; 296/97.6
[58] Field of Search ................ 296/97 R, 97 B, 97 C, 296/97 D, 97 E, 97 F, 97 G, 97 H

[56] References Cited

U.S. PATENT DOCUMENTS

| | | | |
|---|---|---|---|
| 2,101,901 | 12/1937 | Fletcher | 296/97 |
| 2,385,557 | 9/1945 | Ward | 296/97 |
| 2,526,889 | 10/1959 | McComb | 296/97 |
| 2,596,873 | 5/1952 | Solmes | 296/97 |
| 2,685,336 | 8/1954 | Menighan | 160/33 |
| 3,853,370 | 12/1974 | Barnhart | 296/97 C |
| 4,058,340 | 11/1977 | Pinkas | 296/97 C |
| 4,169,552 | 10/1979 | Lichtenstein et al. | 296/97 C |
| 4,195,876 | 4/1980 | Timperio | 296/97 G |
| 4,323,275 | 4/1982 | Lutz | 296/97 G |
| 4,399,347 | 8/1983 | Schmitt | 296/97 D |
| 4,526,415 | 7/1985 | Jardine | 296/97 F |
| 4,570,991 | 2/1986 | Lystad | 296/97 G |

FOREIGN PATENT DOCUMENTS

| | | | |
|---|---|---|---|
| 2202768 | 7/1973 | Fed. Rep. of Germany | 296/97 H |
| 2258005 | 5/1974 | Fed. Rep. of Germany | 296/97 G |

Primary Examiner—Robert B. Reeves
Assistant Examiner—Russell D. Stormer
Attorney, Agent, or Firm—John E. Reilly

[57] ABSTRACT

A visor extension unit is releasably attachable to the conventional sun visor of a motor vehicle and is charaterized by including a lateral visor extension panel which is movable through a horizontal guide passage in the visor extension unit so as to effectively increase the windshield area blocked on either side of the sun visor as desired, and a glare shield is movable through a separate pocket formed in the extension unit in a downward direction beneath the sun visor to diminish the glare of light which otherwise would pass through the windshield area beneath the visor.

11 Claims, 2 Drawing Sheets

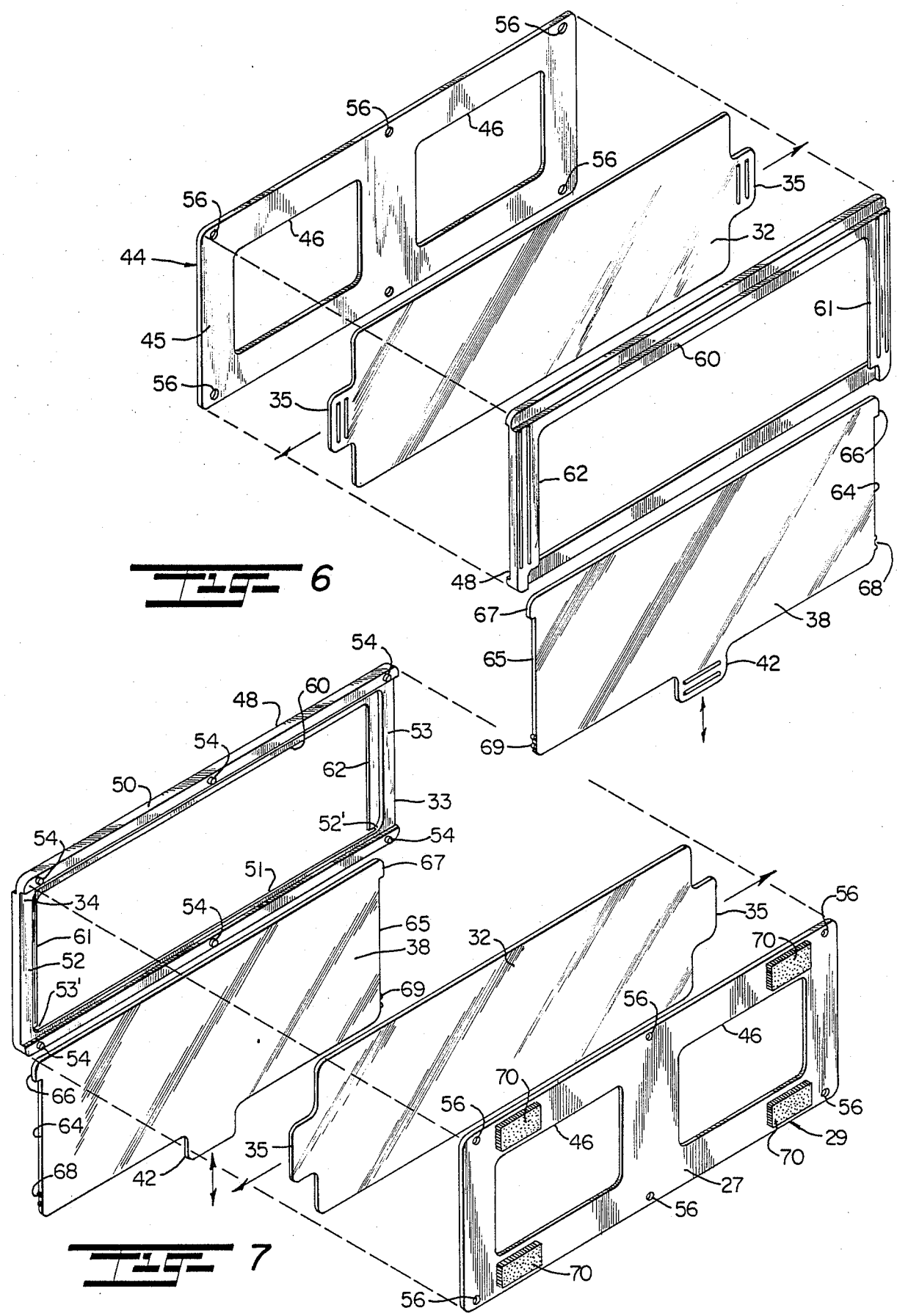

EXTENSION UNIT FOR SUN VISOR

This invention relates to sun visors for motor vehicles; and more particularly relates to a novel and improved sun visor extension unit which is adapted for releasable attachment to and extension of the sun visor of a motor vehicle.

BACKGROUND AND FIELD OF INVENTION

Sun visors are disposed for extension across the windshield area of a motor vehicle in order to shield the occupant or occupants of a vehicle from the glare of the sun. It is also known to tint windshields in order to attenuate the glare to some extent. In many cases, however, the standard sun visor that is employed as a part of original equipment furnished with a motor vehicle does not afford sufficient protection, or in other words does not block out the sun's rays to the desired degree. Numerous approaches have been taken in the past to alleviate this problem. For example, at certain times of the day when the sun is at a particular level or attitude with respect to the windshield, it is virtually impossible to completely eliminate the sun's rays or reduce glare to the extent necessary to avoid reduced visibility. U.S. Pat. No. 4,323,275 to R. M. Lutz discloses the use of auxiliary panels which can be extended parallel to the plane of the visor both in a vertical direction and towards the center of the visor. U.S. Pat. Nos. 2,596,893 to W. P. Solmes and 2,385,557 to G. C. Ward employ sliding panels on a sun visor intended to be furnished as a part of the original equipment on a vehicle. Other representative patents are U.S. Pat. Nos. 2,101,901 to J. H. Fletcher; 2,526,889 to C. L. McComb; 2,685,336 to P. J. Menighan; 3,853,370 to N. S. Barnhart; 4,058,340 to D. Pinkas; 4,169,552 to A. L. Lichtenstein et al; 4,195,876 to H. Timperio; 4,526,415 to G. W. Jardine and 4,570,991 to L. A. Lystad.

A desirable feature of the present invention is to provide a sun visor extension which is primarily designed to be retrofit to existing sun visors and be capable of being releasably but securely attached thereto and is so constructed and arranged as to be capable of completely blocking out the sun's rays in the space between sun visors on the driver's and passenger's sides as well as to substantially attenuate or reduce the sun's glare in that area beneath the sun visor.

SUMMARY OF THE INVENTION

Accordingly, it is an object of the present invention to provide for a novel and improved sun visor extension for motor vehicles which is mountable on existing sun visors of the vehicle.

It is a further object of the present invention to provide for a novel and improved sun visor extension which is releasably connectable to existing sun visors and can be selectively extended both in opposite lateral and vertical directions to most effectively block and attenuate the glare of the sun.

Yet another objective of the present invention is to provide for a sun visor extension as an accessory to existing sun visors which is compact, durable and of lightweight construction and will not interfere with normal use and effectiveness of the sun visor when attached thereto.

It is an additional object of the present invention to provide for a highly simplified but unique means for extension and retraction of a sun visor extension when mounted on a sun visor of an automobile and which is stowable in securely locked position on the sun visor so as not to interfere with normal operation of the visor.

In accordance with the present invention, there has been devised an accessory for sun visors of the type customarily employed in motor vehicles wherein the visor is disposed for extension across the windshield area of the vehicle and is pivotal about a horizontal axis between an upwardly inclined, out-of-the-way position and a downwardly extending, operative position to shield occupants of the vehicle from the glare of the sun. The accessory unit of the present invention includes a support frame of generally rectangular configuration having opposed surfaces and means for attaching one of the surfaces to the body of the sun visor, a lateral visor extension panel of flat, generally rectangular configuration disposed between the opposed surfaces of the unit, the unit having guide means between the opposed surfaces for lateral extension of the panel selectively through one of a pair of guide passages at opposite ends of the member; the extension panel is frictionally engaged by the guide means and has grasping means at opposite ends of the panel so as to require positive manual engagement and movement of the panel in the horizontal direction of the extension member through the guide passages; and further a light-diminishing glare shield is normally disposed in superimposed relation to the extension panel, there being second guide means frictionally engaging the glare shield to retain it in the retracted or superimposed position with respect to the extension panel and having a downwardly opening guide slot for downward vertical extension of the shield beyond the lower edge of the sun visor, and second grasping means on the shield is engageable by an occupant of the vehicle to positively advance the shield a selected distance downwardly and away from the extension member and lower edge of the sun visor.

Other objects, advantages and features of the present invention will become more readily appreciated and understood when taken together with the following detailed description in conjunction with the accompanying drawings, in which:

BRIEF DESCRIPTION OF THE DRAWINGS

FIG. 6 is an exploded view of the preferred form of sun visor extension unit as seen from the exposed surface when in attached relation to an existing visor; and FIG. 7 is another exploded view of the preferred form of sun visor extension unit as seen from the rear or attached surface of the extension.

DETAILED DESCRIPTION OF THE PREFERRED EMBODIMENT

Figure 1:
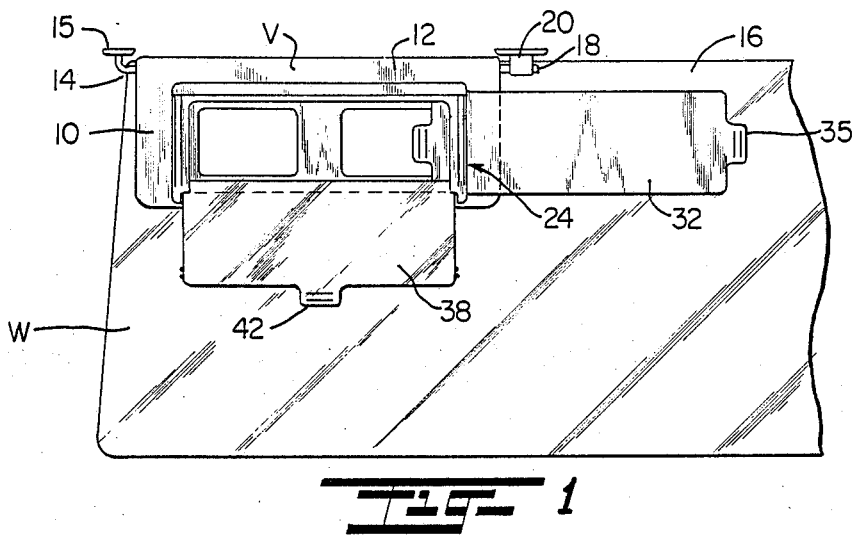
FIG. 1 is a front view in elevation illustrating the preferred form of sun visor extension of the present invention in assembled relation to a conventional sun visor of a motor vehicle.
Figure 2:
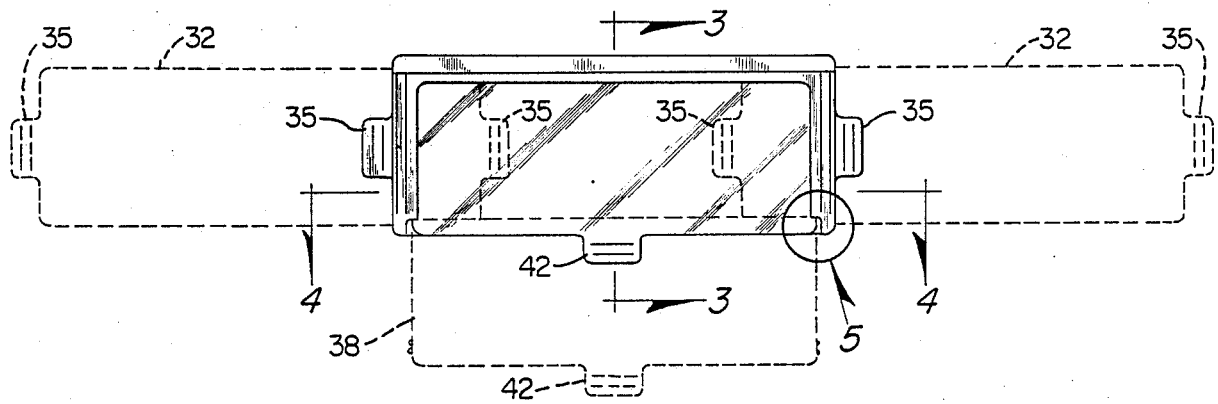
FIG. 2 is an enlarged view and in more detail of the preferred form of sun visor extension unit shown in FIG. 1 and illustrating the extended positions of the extension panel in dotted form.
Figure 4:
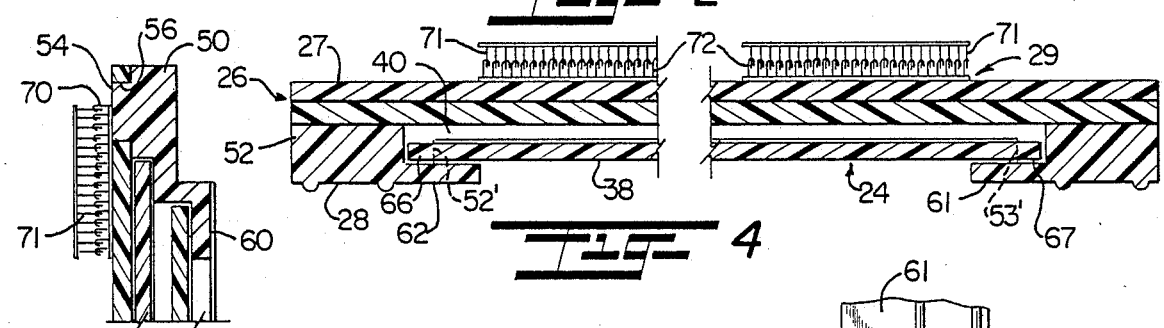
FIG. 4 is a cross-sectional view taken about lines 4—4 of FIG. 2.
Figure 3:
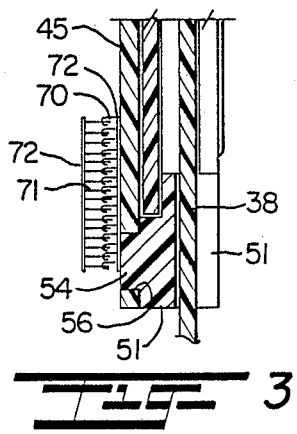
FIG. 3 is a cross-sectional view taken about lines 3—3 of FIG. 2.
Figure 5:
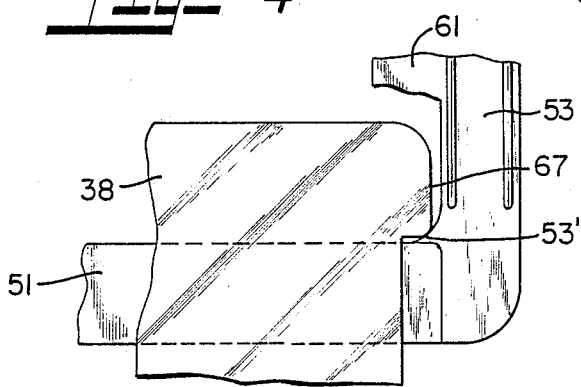
FIG. 5 is a somewhat fragmentary view in elevation and enlarged of one corner of the sun visor extension unit as shown in FIG. 2.

Referring in more detail to the drawings, there is shown by way of illustrative example in FIG. 1 a conventional or standard form of sun visor V positioned within the interior of a motor vehicle for extension along the upper portion of a windshield W. Typically, the sun visor V is disposed for extension both along the driver and passenger sides of the windshield, the visor V as illustrated being shown on the driver's side only. In a well-known manner, the visor is of flat, generally rectangular configuration having opposed inner and outer surfaces, the inner surface which faces away from the windshield being generally represented at 10 and is suspended along its upper edge 12 from an elongated rod 14. The rod 14 includes a right angle extension 15 which is pivotally secured to the vehicle roof above the windshield header 16 to permit movement of the visor V from a position as shown partially covering the upper portion of the windshield W to a position partially covering the side window, not shown, along the passenger side of the car. The rod 14 also typically includes a free end 18 which can be releasably secured to a retainer bracket 20 adjacent to the central portion of the windshield. The visor V is independently pivotal about the rod 14 so that it can be swung between a raised position along the interior of the roof of the vehicle and a lowered position as shown across the upper portion of the windshield.

As further noted from FIG. 1, even when the standard visor is disposed in its lowered position across the upper portion of the windshield, there are substantial gaps or spaces at opposite ends of the visor V which are not blocked by the visor and through which the sun's rays are permitted to pass. The same is true of the area below the visor and make it impossible to completely block or limit the passage of the sun's rays or to reduce the glare of the sun or light to the extent necessary to avoid reduced visibility on the part of the driver. This is especially true at certain times of the day when the sun is relatively low on the horizon and can create the most critical problems of reduced visibility.

The present invention is directed to an accessory in the form of a novel and approved visor extension unit as represented at 24 which is broadly comprised of an elongated support frame 26, the support frame being of generally rectangular configuration and having opposed, flat surfaces 27 and 28, and connecting means 29 on one of the flat surfaces 27 serve to releasably attach the entire unit 24 to the inner surface 10 of the sun visor. A first lateral visor extension panel 32 is of flat, generally rectangular configuration and disposed within a horizontal guide passage 34 in the support frame 26 parallel to and between the opposed surfaces 27 and 28 for lateral sliding movement or extension away from the unit selectively through opposite ends of the guide passage 34, for example, as illustrated in FIGS. 6 and 7. The lateral extension panel 32 preferably is a solid, substantially rigid member and has grasping means in the form of tabs 35 at opposite ends which can be manually engaged for movement of the extension member 32 in either direction away from the extension unit. For example, as shown in FIG. 1, it can be extended a substantial distance away from one end of the visor extension unit so as to effectively double the area blocked or covered by the sun visor V.

In addition, a light-diminishing or glare-attenuating shield 38 is disposed within a separate pocket area 40 in the support frame 26 for slidable movement between a stored or inoperative position in closely spaced, parallel relation to the extension member 32 and an extended position, as shown in FIG. 1, in which the glare shield 38 is slidably advanced through the pocket 40 in a downward direction away from the unit 24, the glare shield having grasping means in the form of a tab 42 in the plane of the shield at its lower edge to facilitate grasping by the driver of the vehicle so as to positively advance the shield a selected adjustable distance downwardly and away from the unit 24 and beyond the lower edge of the sun visor V.

Now considering in more detail the construction and arrangement of a preferred form of visor extension unit 24, the support frame 26 is made up of a flat, rectangular plate portion 44 which, along its external or exposed surface defines the surface 27 to which the connecting means 29 is secured, and an opposed flat surface 45. A pair of rectangular recesses or openings 46 are formed through the intermediate thickness of the plate merely to reduce the weight of the plate without substantially weakening it. A bracket 48 which defines the pocket 40 is permanently affixed to the surface 45 of the plate 44, the bracket 48 being in the form of an open rectangular support having opposite upper and lower frame portions 50 and 51 and opposite end frame portions 52 and 53. Locating pins 54 at spaced intervals along the upper and lower frame portions 50 and 51 facing the plate 44 are insertable into correspondingly spaced openings 56 in the plate. In order to form the guideway or pocket 40 for slidable movement of the glare shield 38 with respect to the support frame 26, spaced ledges or overhangs project inwardly along and offset from three sides of the bracket including a first overhang or ledge 60 projecting from the frame portion 50 and ledge portions 61 and 62 projecting inwardly toward one another from opposite end frame portions 52 and 53, respectively, of the bracket 47. As seen, the ledges 60, 61 and 62 are formed on that side of the thickness of the unit 24 opposite to the surface 27, the exposed surfaces of the ledges 60 to 62 defining the flat surface portion or area 28.

The upper and lower frame portions 50 and 51 are offset in a direction toward the plate 44 so that in assembled relation to the plate form the common channel or guide passage 34 which extends the full length of the unit 24 for lateral or endwise movement of the extension panel 32 in either direction through the guide passage 34 and away from the unit 24. Slight inward lateral projections 52' and 53' at the lower ends of the ledges 61 and 62 serve as limit stops for the glare shield 38 in a manner to be described.

The preferred form of shield 38 is composed of a plastic material which is tinted or polarized so as to absorb or substantially reduce the glare from the sun's rays while permitting full visibility through the shield without substantial distortion. Similarly, the shield is capable of substantially reducing glare from the lights of oncoming cars when used at night. In construction, the shield 38 is of uniform thickness throughout and is of a length such that opposite ends 64 and 65 are disposed within the limited spaces 61' and 62' formed by the ledges or overhangs 61 or 62, and the ends 64 and 65 have lateral projections 66 and 67 at the upper end of the glare shield as well as relatively narrow ribs or projections 68 and 69 at opposite ends more nearly adjacent the lower edge of the shield adjacent to the tab 42. The glare shield 38 is sized such that the projections 66 and 67 are freely slidable through the passageways defined by the ledges 61 and 62 but will move into abutting relation to the projections 52' and 53' at the lower ends thereof when the glare shield 38 is drawn in a direction downwardly away from the unit 24. When returned to the uppermost stored position, the ribs 68 and 69 will move into close fitting, frictional engagement with the projections 52' and 53' to releasably but securely retain the glare shield in place. Accordingly, when the glare shield 38 is to be advanced away from the unit it is necessary to overcome the frictional engagement between the ribs 68 and 69 and the inner confronting surfaces of the projections 52' and 53'. Of course, the ribbing 68, 69 may extend along the entire length of the opposite ends so that the glare shield can be adjustably positioned at any desired point of extension downwardly away from the unit 24.

In order to attach the extension unit 24 to the sun visor V, the connecting means 29 preferably take the form of a Velcro ® or other form of thistle and hook fastener arrangement, there being a series of four complementary fasteners as indicated at 70 permanently affixed at the four corners of the inner surface 27 of the plate and a series of four complementary fastener strips 71 permanently affixed to the surface 10 of the visor.

One suitable form of attachment for the fasteners 70 and 71 to the respective surfaces of the extension unit 24 and surface 10 of the visor V is to employ a pressure sensitive adhesive along the backing surface 72 of the strips which will serve to firmly bond or unite the fastener strips to the respective surfaces. In this way, the extension unit can be securely but releasably attached by mating the fastener strips 70 to the strips 71 and firmly pressing together. In this way, when desired it is possible to remove the visor extension unit for cleaning or maintenance simply by separating the fastener strips 70 from the strips 71.

It will be evident from the foregoing that the support frame consisting of the plate 44 and bracket or holder 48 may be of unitary or one-piece construction. However, it is preferred to construct of separate elements and assemble as described in order that the glare shield 38 may be first assembled in place between the support plate 45 and bracket 40 before they are united together. Preferably, the various parts of the extension unit 24 all can be made of lightweight plastic materials. Moreover, the tolerances in manufacture may be such that the guide passage 34 and pocket 40 as described will establish close-fitting relationship with the glare shield 38 and extension member 32, respectively, so that in movement of the extension member and/or glare shield each can be advanced to different selected positions and will remain in place until positively advanced by the user to another selected position or returned to the stored position in front of the visor.

In use, the unit is attached to the surface of the sun visor so that when the sun visor is in a raised position the unit will be above the visor somewhat against the interior of the roof of the vehicle. When the sun visor is pivoted downwardly, the unit 24 is disposed in facing relation to the driver or other occupant of the vehicle. The extension panel may then be drawn in either direction outwardly from the guide passage to effectively extend the visor in its lengthwise or horizontal direction. Similarly, the glare shield 38 may be effectively drawn downwardly by grasping the tab 42 in the manner described so as to reduce the glare from any light passing through the windshield beneath the sun visor. It will be appreciated that the extension panel 32 and glare shield 38 may be used independently or together to block and reduce the glare of light as required. Of course, in some applications, it may be desirable to use a completely opaque shield to completely block the passage of light beneath the visor; however, in the preferred form, the glare shield will permit visibility through the shield very much in the nature of the lens material that is employed in sunglasses.

It is therefore to be understood from the foregoing that while a preferred embodiment of the present invention has been herein set forth and described, various modifications and changes may be made in the construction and arrangement of parts without departing from the spirit and scope of the present invention as defined by the appended claims.

I claim:

1. In a sun visor for vehicles wherein the visor is disposed for extension across the windshield area of the vehicle and is pivotal about a horizontal axis to shield occupants of the vehicle from the glare of the sun, the improvement comprising:

a sun visor extension unit including a support frame of generally rectangular configuration having opposed surfaces and means for attaching one of said surfaces to a surface of said sun visor;

a lateral visor extension panel of flat generally rectangular configuration disposed between said opposed surfaces of said unit, said unit including a horizontal guide passage between said opposed surfaces for lateral advancement of said extension panel away from said unit through one of said opposite ends of said unit, said extension panel having grasping means at opposite ends of said extension panel whereby to require positive manual engagement and movement in a horizontal direction of said extension panel through said guide passage; and a light-diminishing glare shield normally disposed in superimposed relation to said extension panel, said glare shield being of flat, generally rectangular configuration, said unit having guide means frictionally engaging said glare shield to normally retain it in the superimposed position with respect to said extension panel, said guide means including a downwardly opening guide slot for downward vertical extension of said shield beyond the lower edge of said sun visor, grasping means on said shield engageable by an occupant of the vehicle to adjustably position said shield different extended distances downwardly and away from said unit and beyond the lower edge of said sun visor, and limit stop means interposed between said glare shield and guide means to limit the movement of said glare shield a maximum extended distance away from said unit in a downward direction.

2. In a sun visor according to claim 1, said limit stop means having projections at opposite ends thereof adjacent to one edge of said glare shield away from said grasping means, and inward projections on said guide means in the path of movement of said projections on said glare shield as said projections approach the lower end of said unit.

3. In a sun visor according to claim 1, said guide means including a bracket defining a shallow rectangular pocket for insertion of said glare shield in closely spaced, parallel relation to said extension panel.

4. In a sun visor according to claim 3, said bracket having an open generally rectangular frame portion and offset ledges extending along three sides of said frame portion.

5. In a sun visor according to claim 4, said unit includng a generally flat plate member affixed to one side of said bracket opposite to said offset ledges with said guide passage extending between said flat plate member and said bracket.

6. In a sun visor for vehicles wherein the visor is disposed for extension across the windshield area of the vehicle and is pivotal about a horizontal axis to a lowered position partially blocking the windshield area to shield occupants of the vehicle from the glare of the sun, the improvement comprising:
   a sun visor extension unit including a support member of generally rectangular configuration having opposed flat surfaces and means for attaching one of said flat surfaces to a surface of said sun visor facing the occupant when in the lowered position;
   a lateral visor extension panel of flat generally rectangular configuration disposed between said opposed flat surfaces of said unit, said unit including first guide means between said opposed flat surfaces for lateral extension selectively through one end of said guide means at opposite ends of said unit, said extension panel being frictionally engaged by said first guide means and having first grasping means at opposite ends of said extension panel whereby to require positive manual engagement and movement in a horizontal direction of said extension panel through said first guide means; and
   a light-diminishing glare shield normally disposed in superimposed relation to said extension panel, said unit having second guide means frictionally engaging said glare shield to retain it in the superimposed position with respect to said extension panel, said second guide means including a downwardly opening guide slot for downward vertical extension of said shield beyond the lower edge of said sun visor, and second grasping means on said shield engageable by an occupant of the vehicle to positively advance said shield to different extended positions downwardly and away from said unit and beyond the lower edge of said sun visor.

7. In a sun visor according to claim 6, said support member including a flat plate member defining one of said opposed flat surfaces and said second guide means including a bracket having ledge portions defining the other of said opposed flat surfaces, said first guide means extending between said plate member and said bracket, and said second guide means defined by a shallow rectangular pocket in said bracket.

8. In a sun visor according to claim 7, said unit being of elongated rectangular configuration corresponding to the configuration of said sun visor, and releasable attaching means between one of said opposed flat surfaces on said plate member and a rectangular surface of said sun visor.

9. In a sun visor according to claim 8, said releasable attaching means defined by hook and thistle fasteners at spaced locations on said sun visor and said unit.

10. In a sun visor according to claim 6, said first and second grasping means defined by tabs extending away from opposite ends of said extension member and from a lower end of said glare shield, each of said tabs being in the plane of said extension panel and said shield, respectively.

11. In a sun visor according to claim 6, said glare shield composed of a material which is tinted to reduce the glare of any light passing through said shield.

* * * * *